(12) United States Patent
Guriel et al.

(10) Patent No.: US 12,259,921 B1
(45) Date of Patent: Mar. 25, 2025

(54) SYSTEMS AND METHODS FOR CLUSTERING DIGITAL CONTENT

(71) Applicant: Microsoft Technology Licensing, LLC, Redmond, WA (US)

(72) Inventors: Jennifer Rose Guriel, Kirkland, WA (US); Abdelrahman Khaled Abdo Mohamed, Seattle, WA (US); Mingqi Wu, Bellevue, WA (US); Gershom Payzer, Redmond, WA (US); Christopher Ian Charla, Seattle, WA (US); Madeline Jaye Whisenant, Seattle, WA (US); Bridgette Marie Kuehn, Seattle, WA (US); Jianxun Lian, Beijing (CN); Licheng Pan, Hangzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/529,975

(22) Filed: Dec. 5, 2023

(51) Int. Cl.
*G06F 16/45* (2019.01)
*G06F 40/40* (2020.01)

(52) U.S. Cl.
CPC ............. *G06F 16/45* (2019.01); *G06F 40/40* (2020.01)

(58) Field of Classification Search
CPC ................................. G06F 16/45; G06F 40/40
USPC .......................................................... 707/737
See application file for complete search history.

(56) References Cited

U.S. PATENT DOCUMENTS

| | | | | |
|---|---|---|---|---|
| 12,013,859 B2 * | 6/2024 | Andre | ............... | G06F 16/24556 |
| 2017/0099592 A1 * | 4/2017 | Loeb | ................... | G06Q 10/107 |
| 2021/0034657 A1 * | 2/2021 | Kale | ..................... | G06V 20/35 |
| 2021/0326400 A1 * | 10/2021 | Qiu | ..................... | G06F 16/9535 |
| 2022/0374482 A1 * | 11/2022 | G Rao | ................ | G06F 16/9535 |
| 2024/0273793 A1 * | 8/2024 | DeCharms | ............... | G09B 5/06 |

\* cited by examiner

*Primary Examiner* — Hicham Skhoun
(74) *Attorney, Agent, or Firm* — Ray Quinney & Nebeker; James Bullough

(57) ABSTRACT

This disclosure relates to a content cluster system that provides a framework for leveraging large language models (LLMs) to tag content items (e.g., interactive multimedia content items, such as gaming content items) with attribute tags and, based on attribute tags for related content items, generating cluster descriptions of a cluster of content items. Features of the content cluster system involve tagging content items, determining multi-dimensional embeddings for the content items, and clustering the content items based on proximity of values contained within the multi-dimensional embeddings. The content cluster system may further utilize the LLM to generate one or more cluster descriptions based on the associated tags to create a more creative and dynamic representation of related groupings of titles (e.g., gaming titles). By utilizing LLMs and machine learning resources, the content cluster system provides a scalable approach to conventional approaches in determining and presenting groupings of titles.

20 Claims, 10 Drawing Sheets

| | | | | |
|---|---|---|---|---|
| Charming Escapades Collection Easy-to-learn, kid-friendly experiences with engaging puzzles, lighthearted adventures, and charming atmospheres that appeal to a wide range of players. | Temple Maze | New Frontiers | Twilight Quest | ••• |
| Masterful Creations Managing resources, crafting unique items, and stimulating players' creative instincts. These games allow players to design, build, and maintain a variety of environments. | Craft Mine | Flight Sim | Farm with Friends | ••• |
| Immersive Epics Intense, immersive experiences with engaging stories and a wide array of combat weapons. Players are drawn into detailed worlds filled with action, suspense, and survival challenges. | Before Dawn II | Universe Epic | Pirate's Life | ••• |
| Rush Revolution Extreme sports and high-speed experiences, offering a thrilling sense of speed, action-packed gameplay, and a variety of adrenaline-fueled challenges across diverse environments. | Soccer Car | Rally Race | Downhill Extreme | ••• |

FIG. 8

SYSTEMS AND METHODS FOR CLUSTERING DIGITAL CONTENT

BACKGROUND

Recent years have been a rise in the use of computing resources to provide access to an ever-expanding collection of interactive multimedia content titles (e.g., gaming titles). For example, cloud computing systems are currently being used to provide access to gaming titles via a variety of gaming platforms. With an ever-expanding array of titles across various genres and platforms, the need for effective content organization, cataloging, and meaningful discovery has grown exponentially. This exponential growth in the number and variety of titles has created a number of issues in the organization, categorization, and other features that enable end users to navigate an ever-growing collection of content titles.

For example, traditional methods of categorizing and presenting consumable content to users often rely of manual tagging of titles, which can be prone to inconsistency, subjectivity, and a lack of completeness with respect to individual titles. Additionally, conventional cataloging systems often struggle to capture the nuanced similarities and thematic connections among content titles, which can lead to suboptimal recommendations for users and their preferences.

These and other problems exist with regard to characterizing interactive multi-media content titles, presenting the titles in an organized or effective manner, as well as providing recommendations to users and/or content providers related to engagement with and/or development of multimedia content of various types.

BRIEF DESCRIPTION OF THE DRAWINGS

FIG. 8 illustrates an example report according to at least one embodiment of the present disclosure.

DETAILED DESCRIPTION

Figure 1:
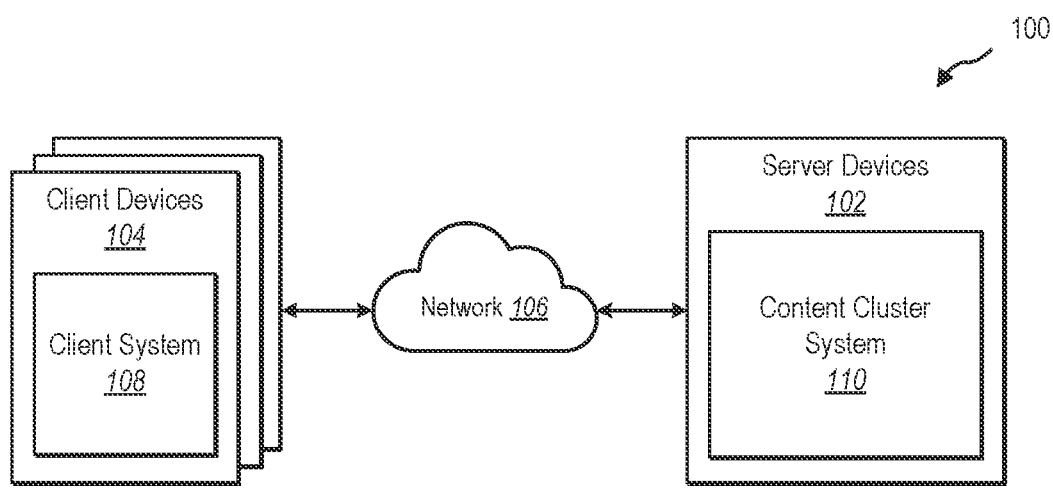
FIG. 1 illustrates an example environment in which a content cluster system is implemented in accordance with one or more embodiments described herein.

The present disclosure is related to a content cluster system for generating descriptions (e.g., model-generated plain language descriptions) of clusters of interactive multimedia content items. The content cluster system may be implemented in connection with a collection of interactive multimedia content items, such as a catalogue of video game content items. Attribute tags may be assigned to each interactive multimedia content item in order to characterize various qualities, attributes, and/or aspects of the interactive multimedia content items. For example, the content cluster system may generate, for each interactive multimedia content item, an input or prompt for a large language model indicating the title of the interactive multimedia content item and the set of possible or candidate attribute tags. Based on the prompts, the large language model may output a subset of corresponding attribute tags for each interactive multimedia content item.

In addition to generating attribute tags for a collection of interactive content item titles, the content cluster system may determine clusters of related interactive multimedia content items. For example, a deep-learning embedding model may learn the attribute tags and other related information associated with each interactive multimedia content item and generate an embedding of values representative of each interactive multimedia content item. The content cluster system may define one or more clusters of embeddings and identify the underlying interactive multimedia content items as being related based on the interactive multimedia content items having a set of common attribute tags.

As will be discussed in further detail below, the content cluster system may further summarize the identified cluster of interactive multimedia content items. For example, the content cluster system may generate another input for the large language model indicating the interactive multimedia content items in the cluster and the set of common attribute tags. Based on the prompt, the large language model may generate a plain language title and description for the cluster of interactive multimedia content items.

Finally, the content cluster system may determine taste clusters that may be used in providing and presenting cluster descriptions and associated information to a user based on observed preferences of the user for interactive multimedia content. For example, based on usage data for the user, the content cluster system may identify one or more of the identified clusters that include interactive multimedia content item(s) with which the user has engaged, and may provide these taste clusters to the user as suggestions or recommendations for interactive multimedia content item that may appeal to the user's preferences. The generated cluster title and cluster description may provide a meaningful and accessible summarization of the interactive multimedia content item in the taste cluster in order that the user may interpret and understand why the taste cluster has been selected or recommended.

As an illustrative example, and as will be discussed in further detail below, the content cluster system may identify a collection of interactive multimedia content items for characterizing based on a set of candidate attribute tags, each of the interactive multimedia content item being identifiable by an associated title. The content cluster system may also identify usage data associated with engagement of a plurality of users with the collection of interactive multimedia content items. For each of the interactive multimedia content items, the content cluster system may provide a first prompt as a first input to a large language model indicating the title of the interactive multimedia content item and the set of candidate attribute tags. Based on the first prompt, the content cluster system may receive from the large language model a first output including a subset of the candidate attribute tags that are determined to be associated with the interactive multimedia content item. The content cluster system may provide as a second input to the large language model a second prompt indicating the title of each of a cluster of interactive multimedia content items determined to be related. The second prompt may additionally indicate a common subset of candidate attribute tags for the cluster including the associated subset of candidate attribute tags for each interactive multimedia content item in the cluster. The content cluster system may receive from the large language model a second output including a cluster title and a cluster description for the cluster generated based on the common subset of candidate attribute tags.

As will be discussed in further detail below, the present disclosure includes a number of practical applications having features described herein that provide benefits and/or solve problems associated with determining wear of a downhole tool. Some example benefits are discussed herein in connection with various features and functionalities provided by a content cluster system implemented on one or more computing devices (e.g., server device(s)). It will be appreciated that benefits explicitly discussed in connection with one or more embodiments described herein are provided by way of example and are not intended to be an exhaustive list of all possible benefits of the content cluster system.

For example, the present disclosure describes a content cluster system that can analyze, characterize, and describe a catalogue of interactive multimedia content items. The content cluster system can determine, at a detailed and nuanced level, a number of qualities, attributes, themes, meanings, and other aspects of each multimedia content items and can represent these attributes based on assigning semantic attribute tags to the multimedia content items. Ultimately, the content cluster system can determine clusters of multimedia content items that are uniquely similar based on similarities of the associated attribute tags, among other factors. In this way, the content cluster system can provide a curated list of similar multimedia content that is based on connections between the multimedia content items at a deeper and more subtle level. This is in contrast to, for example, classifying content based on more surface level and more customary identifiers such as genre, gameplay, etc. These content clusters, in connection with player usage data, may facilitate the content cluster system presenting users with curated lists of multimedia content that are tailored in a more meaningful way to the users' preferences.

In addition to determining clusters of similar multimedia content, the content cluster system can generate plain language descriptions of the clusters. Based on the common attribute tags that motivated the selection of the multimedia content items to a cluster, the content cluster system can generate a cluster title and cluster description. The cluster title and cluster description may summarize the nuanced characteristics that make the multimedia content items similar by describing the semantic meaning of the common attribute tags. For example, the description may describe the style of artwork, combinations of gameplay styles or mechanics, and/or storytelling aspects that may be similar between the multimedia content items. Thus, in addition to identifying multimedia content that is similar in a meaningful way, the content cluster system can describe in plain language the nuance that makes the content similar. This may better enable users to interpret and understand why the multimedia content is being suggested in order to provide more valuable suggestions to the user and further drive user engagement.

In contrast to conventional approaches in which titles are categorized over time using manual processes, embodiments of the content cluster system provide the above-features and functionality using a combination of machine learning and large language models (LLMs) in a way that is significant and unique. For example, the content cluster system leverages the capabilities of a large language model in order to classify the multimedia content into the attribute tags, and then uses a deep-learning embedding model to learn similarities and identify clusters of related embeddings of the interactive multimedia content items. The clusters, as well as common attribute tags for the clusters, are used in generating a follow up prompt that is input into a large language model (e.g., the same LLM as used in tagging the titles) to generate the title and description for the cluster. By implementing a combination of both natural language processing and deep learning (e.g., multiple types of machine learning models), the content cluster system provides analysis and processing of the multimedia content that is accessible and meaningful to a variety of individuals and organizations.

As will be discussed below, the workflow implemented by the content cluster system provides context and explanation on the back-end as to why a cluster was selected by providing a plain-language description and model-generated category explaining in what ways the multimedia content items in the cluster(s) are similar. This is in contrast to conventional "black-box" models and techniques that take the multimedia content items as an input and output the clusters without providing any context as to why clusters are selected or why content is determined to be related. Indeed, these conventional techniques may provide clusters of similar titles, but may do so based on embeddings that are often difficult or impossible to interpret in a meaningful way. By implementing a large language model at several steps along the way, the content cluster system provides plain language interpretations of both the multimedia content classification and clustering.

Further, the content cluster system described herein provides scalability for implementing in connection with an entire catalogue of multimedia content items and for any number of users (e.g., players). For example, the content cluster system can provide human-like categorization and clustering of multimedia content items to an extent that may not be possible or practical using conventional techniques for grouping or otherwise relying on human reviewers. By automating the content classification and grouping processes, as well as implementing human validation of generated descriptions, both human and computing resources may be implemented in a more efficient and effective manner and in a way that scales to an exponentially growing number of multi-media content titles. This effect may be even more apparent when considering that taste clusters may be tailored for the distinct preferences of individual users, which may number in the millions or billions. Thus, the content cluster system may provide a human-like curated catalogue of multimedia content at a scale which is not be realistically achieved through conventional systems and human efforts.

As illustrated in the foregoing discussion, this disclosure utilizes a variety of example terms to describe the features and advantages of one or more implementations. For instance, this disclosure describes the content cluster system in the context of a cloud computing system. As used herein, "cloud computing system" refers to a network of interconnected computing devices that provide various services and applications to computing devices (e.g., server devices and client devices) inside or outside of the cloud computing system. Additional terms are defined throughout the document in different examples and contexts.

As used herein, "large language model" (LLM) refers to an artificial intelligence system that uses deep learning to produce coherent and contextually relevant outputs (e.g., text) based on patterns learned from large amounts of training data. In various implementations, a large language model, such as a multi-modal generative model, refers to an advanced computational system that uses natural language processing, machine learning, and/or image processing to generate coherent and contextually relevant human-like responses.

As used herein, LLMs have a large number of parameters (e.g., in the billions or trillions) and are trained on a vast dataset to produce fluent, coherent, and topic-specific outputs (e.g., text and/or images). LLMs have applications, including natural language understanding, content generation, text summarization, dialog systems, language translation, creative writing assistance, and image generation. A single LLM performs a wide range of tasks based on different inputs, such as prompts (e.g., input instructions, rules, example inputs, example outputs, and/or tasks), data, and/or access to data. In response, the LLM generates various output formats ranging from one-word answers to long narratives, images and videos, labeled and/or tagged datasets, documents, tables, and presentations.

LLMs include models which are primarily based on transformer architectures to understand, generate, and manipulate human language. LLMs can also use a recurrent neural network (RNN) architecture, long short-term memory (LSTM) model architecture, convolutional neural network (CNN) architecture, or other architecture types. Examples of LLMs include generative pre-trained transformer (GPT) models such as GPT-3.5 and GPT-4, bidirectional encoder representations from transformers (BERT) model, text-to-text transfer transformer models such as T5, conditional transformer language (CTRL) models, and Turing-NLG. Other types of LLMs can include sequence-to-sequence models (Seq2Seq), vanilla RNNs, and LSTM networks.

As used herein, "prompt," "query," or similarly used-terms refer to an input provided to a LLM that provides instructions, directions, guidelines, and/or parameters for generating an answer or result. In one or more implementations described herein, a prompt includes carefully selected parameters determined based on various factors, such as available input information and desired output data format. In some implementations, a prompt includes and/or references additional information being provided to an LLM. Additional examples of prompts, including user-generated prompts (e.g., natural language query) and system-generated prompts are provided herein.

As used herein, "interactive multimedia content" or a "interactive multimedia content item" may refer to any digital multimedia with which a user may engage or interact. In some examples, interactive multimedia content items may refer to "gaming content" or "video games" accessible to a user through a video game console or other user device. However, interactive multimedia content items may refer to a variety of digital content other than gaming content, such as film, music, literature, art or any other multimedia that exists in a digital form and which is available for a user to consume through any associated user device. Each interactive multimedia content item may be associated with a title of the interactive multimedia content item. For example, "Minecraft" and "Roblox" may be titles for identifying video game or gaming content items. It will be appreciated that while one or more examples described herein will be discussed primarily in connection with gaming titles and gaming content, features described in connection with gaming content and gaming titles may similarly apply to other titles related to other types of interactive multimedia content items.

As used herein, "attribute tags," "candidate attribute tags," and similar terms may refer to semantic tags, such as words or phrases, that may describe an attribute, aspect, or meaning of interactive multimedia content. Attribute tags may describe any aspect of interactive multimedia content, such as a genre, style, type, mechanic, difficulty, duration, size, limitation, artwork, storytelling, or any other aspect of interactive multimedia. As a non-limiting example, the attribute tags may include tags such as "multiplayer," "social community," "stylized art," "exploration," "cross-platform," "urban," "science-fiction," "3D," "high-quality soundtrack," "crafting," "action," "atmospheric," and "kid-friendly," or any other word, phrase, or description that may relate to an aspect of interactive multimedia content. Indeed, the techniques described herein may be implemented in connection with any number of unique attribute tags for associating with interactive multimedia content.

As used herein, "content genome" may refer to a set of attribute tags associated with a specific interactive multimedia content item. The set of attribute tags defining a content genome may describe aspects (often several) of the interactive multimedia content item at various levels of granularity. In this way, a content genome may define a set of attributes that belong to or describe an interactive multimedia content item. For example, a content genome may include the attribute tags of "hybrid play," "online multiplayer," "infinite completion time," and "bridge cosmetics" signaling that the associated interactive multimedia content item has these attributes. The attribute tags of a content genome may be a subset of attribute tags selected from a pool or collection of candidate attribute tags.

As used herein, "usage data," "player usage data," and similar terms may refer to information associated with how users interact or engage with the interactive multimedia content items. For example, the usage data may indicate user behavior with respect to the interactive multimedia content items, such as a duration, frequency, or recency of interaction with the multimedia content. The usage data may indicate metrics such as game progression, performance, retention, feedback, reviews, demographics, and social interactions of users who engage with the interactive multimedia content items. The usage data may be associated with all of the interactive multimedia content items in a collection or catalogue of multimedia content, or may refer to data of a subset or a single interactive multimedia content item. The usage data may be associated with all users or players who engage with the interactive multimedia content items, such as all users of a platform, console, software, or application. The usage data may be associated with a smaller subset of users or a single user's interaction with one or more interactive multimedia content items.

Additional detail will now be provided regarding systems and methods described herein in relation to illustrative figures portraying example implementations. For example, FIG. 1 illustrates an example environment 100 in which a content cluster system 110 is implemented in accordance with one or more embodiments describe herein. As shown in FIG. 1, the environment 100 includes one or more server device(s) 102. The server device(s) 102 may include one or more computing devices (e.g., including processing units, data storage, etc.) organized in an architecture with various network interfaces for connecting to and providing data management and distribution across one or more client systems. As shown in FIG. 1, the server devices 102 may be connected to and may communicate with (either directly or indirectly) one or more client devices 104 through a network 106. The network 106 may include one or multiple networks and may use one or more communication platforms and/or technologies suitable for transmitting data. The network 106 may refer to any data link that enables transport of electronic data between devices of the environment 100. The network 106 may refer to a hardwired network, a wireless network, or a combination of a hardwired network and a wireless network. In one or more embodiments, the network 106 includes the internet. The network 106 may be configured to facilitate communication between the various computing devices via any protocol or form of communication.

As shown in FIG. 1, the environment 100 may include a content cluster system 110 implemented on the server devices 102. As described below, the content cluster system 110 may determine one or more clusters of the interactive multimedia content items based on these similarities and may generate a semantic title and description of the cluster. The content cluster system 110 may provide the multimedia cluster(s) (and other functionalities described herein) to a client system 108 implemented on the client devices 104. The client system 108 may refer to any client- or user-facing application for accessing and engaging with the features and functionalities provided by the content cluster system 110. For example, the client system 108 may be a gaming client of an associated client gaming device or any software program associated with the content cluster system 110 of the server device(s) 102. One or more features or functionalities of the content cluster system 110 described herein may be performed on, by, or in connection with the client system 108. In this way, the environment 100 may be a cloud computing environment, and the content cluster system 110 may be implemented across one or multiple devices of the cloud computing environment in order to leverage the processing capabilities, memory capabilities, connectively, speed, etc. that such cloud computing environments offer to facilitate the features and functionalities described herein.

The client device(s) 104 may refer to various types of computing devices. For example, one or more client devices 104 may include a mobile device such as a mobile telephone, a smartphone, a personal digital assistant (PDA), a tablet, a laptop, or any other portable device. Additionally, or alternatively, the client devices 104 may include one or more non-mobile devices such as a desktop computer, server device, or other non-portable device. In some embodiments, the client devices 104 may refer to a gaming system or console, such as a mobile or non-mobile gaming console. In one or more implementations, the client devices 104 include graphical user interfaces (GUI) thereon (e.g., a screen of a mobile device). In addition, or as an alternative, one or more of the client devices 104 may be communicatively coupled (e.g., wired or wirelessly) to a display device having a graphical user interface thereon for providing a display of system content. The server device(s) 102 may similarly refer to various types of computing devices. Each of the devices of the environment 100 may include features and/or functionalities described below in connection with FIG. 10.

As mentioned above, the client system 108 may refer to a gaming client or application (e.g., Xbox, PlayStation, PC). The client system 108 may enable a user of the client device 104 to receive and interact with curated and annotated list(s) of interactive multimedia content items from the content cluster system 110 that might appeal to individual preferences for multimedia content. While one or more examples described herein may relate specifically to providing clusters of gaming content, it will be understood that features and functionality in connection with the content cluster system 110 may apply to any type of interactive multimedia, such as film, music, literature, artwork, or any other type of multimedia content with which a user may engage. Indeed, the client devices 104 may additionally or alternatively refer to any type of device for engaging or interacting with interactive multimedia content, such as audio and/or video playback devices, electronic reading devices, display devices, etc. These examples are not intended to be limited to specific formats of multimedia content or to specific types of client devices, and may be applicable to any type of multimedia content and/or client device.

Figure 2:
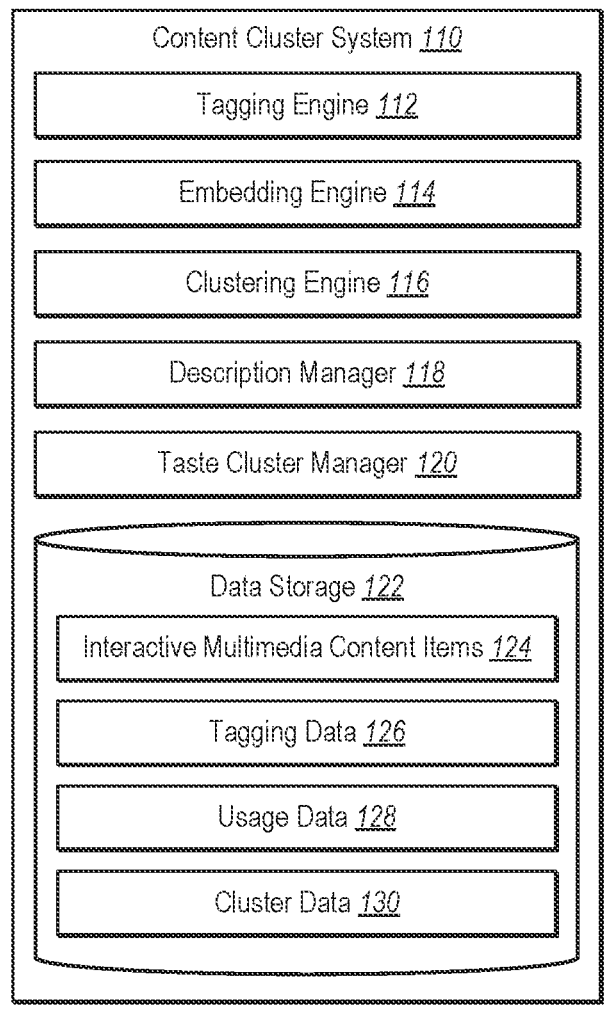
FIG. 2 illustrates an example implementation of a content cluster system as described herein, according to at least one embodiment of the present disclosure.

FIG. 2 illustrates an example implementation of the content cluster system 110 as described herein, according to at least one embodiment of the present disclosure. The content cluster system 110 includes a tagging engine 112, an embedding engine 114, a clustering engine 116, a description manager 118, and a taste cluster manager 120. The content cluster system 110 also includes a data storage 122 having interactive multimedia content items 124, tagging data 126, usage data 128, and cluster data 130 stored thereon. While one or more embodiments described herein describe features and functionalities performed by specific components 112-120 of the content cluster system 110, it will be appreciated that specific features described in connection with one component of the content cluster system 110 may, in some examples, be performed by one or more of the other components of the content cluster system 110.

By way of example, one or more of the features of the tagging engine 112 related to tagging content items may be delegated to other components of the content cluster system 110. As another example, while certain information may be encoded or embedded by the embedding engine 114, in some instances, some or all of these features may be performed by the clustering engine 116 (or another component of the content cluster system 110). Indeed, it will be appreciated that some or all of the specific components may be combined into other components and specific functions may be performed by one or across multiple components 112-120 of the content cluster system 110.

As mentioned above, the data storage 122 includes interactive multimedia content items 124. The interactive multimedia content items 124 may include a collection of various multimedia content, such as gaming content, stored on, accessible to, or otherwise associated with the content cluster system 110. The interactive multimedia content items 124 may include a catalogue or database of all interactive multimedia content items available to the content cluster system 110, or may be a subset of interactive multimedia content items of interest with which to implement the content cluster system 110.

Additional detail in connection with the components of the content cluster system 110 will now be discussed in connection with a workflow in which each of the components cooperatively generate attribute tags, generate clusters of tags based on machine-learned embeddings, and provide a presentation of an LLM-generated description of the various clusters in accordance with one or more embodiments. In particular, this workflow will be discussed in connection with FIGS. 3-8 in connection with tagging, clustering, and providing descriptions associated with gaming content titles. As noted above, features described in connection with gaming titles may be applicable to other types of interactive multimedia content items.

Figure 3:
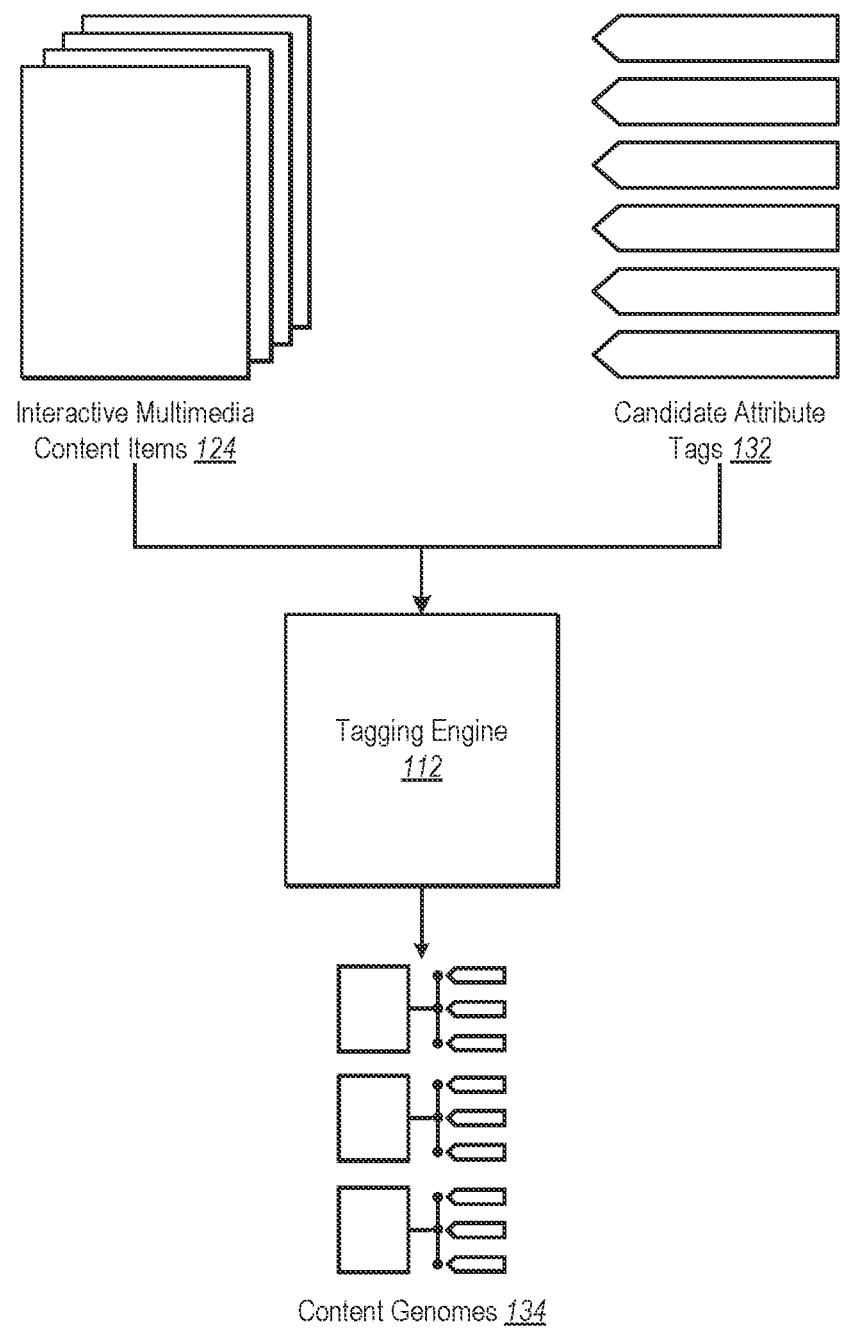
FIG. 3 illustrates example features and functionalities of a tagging engine as described herein, according to at least one embodiment of the present disclosure.

As mentioned above, the content cluster system 110 includes a tagging engine 112. The tagging engine 112 may facilitate associating one or more attribute tags with one or more interactive multimedia content items. FIG. 3 illustrates example features and functionalities of the tagging engine 112, according to at least one implementation. As will be discussed in further detail below, the tagging engine 112 may refer to an LLM model that is trained to associate attributes with interactive multimedia content item titles.

As shown in FIG. 3, the tagging engine 112 may receive or otherwise identify attribute tags associated respective interactive multimedia content items 124. In one or more embodiments, the candidate attribute tags 132 refer to a collection of predetermined tags representing potential attributes or characteristics that may be identified in connection with the interactive multimedia content items 124. For example, a system administrator may input and/or define the set of candidate attribute tags 132 in the tagging data 126 as a set of parameters to consider in generating a set of tags in connection with each of the interactive multimedia content items 124. In some embodiments, the tagging engine 112 generates one or more of the candidate attribute tags 132.

In some embodiments, the tagging engine 112 determines or generates (e.g., outputs) a content genome 134 for each of the interactive multimedia content items 124 (e.g., content item titles). The tagging engine 112 may receive the interactive multimedia content items 124 (or simply titles of the interactive multimedia content items 124) and a set of candidate attribute tags 132 as parameter tags and may tag or otherwise associate one or more of the candidate attribute tags 132 with each interactive multimedia content item 124. As shown in FIG. 3, the tagging engine 112 may output a set of content genomes 134 including identifiers (e.g., titles) of interactive multimedia content items 124 and associated attribute tags that are selectively identified from the set of candidate attribute tags 132 provided as inputs to the tagging engine 112.

In one example, the tagging engine 112 may assess each of the candidate attribute tags 132 with respect to an interactive multimedia content item 124, and may determine whether and/or to what extent the attribute tag 132 describes (e.g., an aspect of) the interactive multimedia content item 124. In determining these associations, the tagging engine 112 may rely on any information from a large knowledge base on which the tagging engine 112 was previously trained. Based on this assessment, the tagging engine 112 may identify a subset of the candidate attribute tags 132 (e.g., selectively identify attribute tags) that represent various aspects of the interactive multimedia content item 124. In this way, the tagging engine 112 may generate or otherwise output a content genome 134 in which a set of attribute tags that describes features, aspects, traits, qualities, etc. of the interactive multimedia content item 124 are assigned to a corresponding title of an interactive multimedia content item.

In associating the interactive multimedia content items and corresponding tags, the tagging engine 112 may tag the interactive multimedia content items 124 based on a semantic description or meaning of the candidate attribute tags 132 applying to an aspect of the interactive multimedia content item 124. For example, a video game may be tagged with attribute tags of "action," "3D," "crafting," "collecting," and "creativity," signifying that the gaming content has the attributes identified by those attribute tags. In this way, the attribute tags 132 that are tagged or assigned to an interactive multimedia content item 124 may provide a deep, rich, and/or nuanced description of the interactive multimedia content item 124. This may be in contrast to, for example, identifying multimedia content with only identifiers such as game genre, play style, popularity, etc. which may provide a less meaningful and/or more surface level identification of the interactive multimedia content items 124.

In some embodiments, the tagging engine 112 is implemented as (or otherwise includes) a machine learning model such as an LLM (e.g., GPT-4) for tagging the interactive multimedia content items 124 and/or for tagging the interactive multimedia content items 124 with corresponding tags from the candidate attribute tags 132. For example, the tagging engine 112 may generate an input or prompt for the LLM. In some embodiments, the prompt includes the associated title of an interactive multimedia content item 124 and the collection of candidate attribute tags 132 as parameters for tagging. The tagging engine 112 may generate context information to include within the prompt. For example, the prompt may define parameters for classifying the interactive multimedia content item 124, such as a creativity parameter, a confidence parameter, task instructions, constraints, examples, comparisons, feedback and evaluation, or any other parameters.

The tagging engine 112 may generate the prompt for use by the LLM in any manner. For example, the tagging engine 112 may prepare a string concatenation of the title and candidate attribute tags 132. In some examples, the tagging engine 112 generates a prompt as a script or generates instructions for the LLM in a scripting language. The tagging engine 112 may generate the prompt as a text input to the LLM, such as for input into a conversation based LLM. In some examples, the tagging engine 112 prepares entries for entry forms for the LLM. In some embodiments, the tagging engine 112 implements and/or communicates via an application programming interface (API) with the LLM in order to input the prompt to the LLM. In some examples, the tagging engine 112 generates a prompt that is focused on and/or specialized for a particular LLM, such as using a particular syntax. In some embodiments the prompt is structured in a particular manner to direct the LLM on how to determine which attribute tags apply to a given title. For example, the prompt may divide the attribute tags 132 into categories, and may provide explanations of attribute tags as needed. A non-limiting example prompt may appear as follows:

Select all the tags that describe 'Ori and the Will of the Wisps' from the following tags related to:
1—Moods: {Atmospheric, Comedic, Cozy, Dark, Zen}
2—Art: {Anime Art, Cute Art, Hand Drawn Art, Pixel Art, Realistic Art, Retro Art, Stylized Art, Other Art}
3— . . .

In this way, the tagging engine 112 may generate a prompt for instructing or directing the LLM to generate the content genomes 134.

As noted above, in some embodiments, the LLM is trained based on a large, general knowledge base. For example, the LLM may be a robust model that has been trained based on and/or has taken in, a vast quantity of the information available via the internet. The LLM may be trained to know, identify, and/or interpret the context and relationship between a given title of an interactive multimedia content item 124 and the candidate attribute tags 132 available for tagging. For example, the LLM may classify a video game based on learned knowledge from different sources such as blogs, articles, reviews, posts, comments, or any of various other sources of content associated with the video game title.

In some embodiments, the tagging engine 112 may perform additional operations related to cleaning up the output from the LLM. For example, the tagging engine 112 may format or structure the data in a particular manner. The tagging engine 112 may remove one or more attribute tags 132 determined by the LLM to apply to a given interactive multimedia content item 124 to address inconsistencies and/or fix hallucination issues of the LLM. For example, the tagging engine 112 may remove low-frequency tags in the output. In some embodiments, the LLM may generate one or more attribute tags for classifying the interactive multimedia content items 124, for example, in addition to the candidate attribute tags 132. The tagging engine 112 may remove these generated attribute tags from the output, or may keep or incorporate one or more of these generated attribute tags with the interactive multimedia content items 124.

In this way, the tagging engine 112 may generate or otherwise determine a content genome 134 representative of a title and associated attributes for each of the interactive multimedia content items 124. The tagging engine 112 may store (e.g., cause to store) the content genomes 134 to the data storage as tagging data 126. For example, the tagging data 126 may include metadata representative of the content genomes 134 and may be stored, embedded, or otherwise associated with the interactive multimedia content items 124. The tagging data 126 may indicate the attribute tags 132 included in each content genome 134, as well as the output or results from the LLM, the prompt or input provided to the LLM, the parameters defined for the query to the LLM, or any other information associated with, or with obtaining, the content genomes 134.

Figure 4:
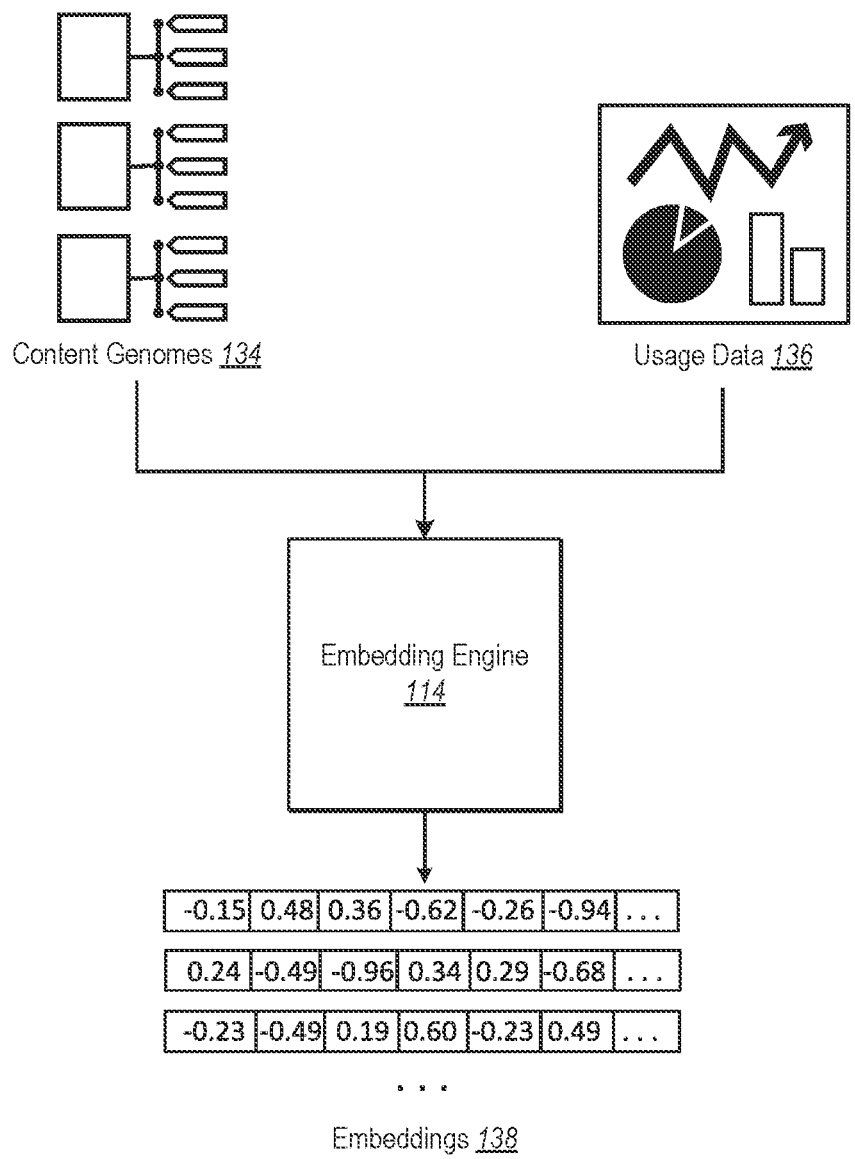
FIG. 4 illustrates example features and functionalities of an embedding engine as described herein, according to at least one embodiment of the present disclosure.

After generating the content genomes 134, the content cluster system 110 may use an embedding engine 114 to generate a plurality of embeddings 138 based on tags and usage data 136. As shown in FIG. 4, an embedding engine may receive as input the content genomes 134 and usage data 136 (e.g., usage data associated with each of the titles of the individual content genomes 134) and generate a plurality of embeddings 138 representative of each of the interactive multimedia content items 124.

The embedding engine 114 may be or may implement a deep-learning model to generate embeddings 138 associated with the interactive multimedia content items 124 and other related information. For example, for each interactive multimedia content item 124, the embedding engine 114 may generate an embedding including a multi-dimensional vector that represents various aspects of the interactive multimedia content item 124 as a numerical representation. The embeddings 138 may represent and/or include any information or feature related to an interactive multimedia content item 124. For example, the embedding engine 114 may receive the genome 134 for each interactive multimedia content item. The embedding engine 114 may accordingly generate the embeddings 138 to indicate the title of an interactive multimedia content item 124 and to represent the content genome 134 (and associated attribute tags 132) of the interactive multimedia content item 124. In this way, the attribute tagging performed by the tagging engine 112 may be learned and encoded in the numerical representation of the embeddings 138.

As further shown in FIG. 4, the embedding engine 114 receives usage data 136 for the collection of interactive multimedia content items 124. As discussed herein, the usage data 136 may indicate the usage and behavior of users with respect to the interactive multimedia content items 124. In some embodiments, the embedding engine 114 identifies one or more usage correlations from the usage data 136 and incorporates the usage correlations into the embeddings 138. For example, the embedding engine 114 may identify or learn from the usage data 136 that when users (e.g., a simple or large majority) engage with a particular interactive multimedia content item 124 (e.g., Title A), they also typically engage with another interactive multimedia content item 124 (e.g., Title B). As another example, the embedding engine 114 may identify from the usage data 136 that when users (e.g., a simple or large majority) engage with a particular interactive multimedia content 124 (e.g., Title X), they typically do not engage with another interactive multimedia content item 124 (e.g., Title Y). In this way, the usage correlations may identify hidden correlations (including inverse correlations) between interactive multimedia content items 124 that provide information about the interactive multimedia content items 124 that is beyond the scope of what may be indicated by the attribute tags 132. The embedding engine 114 may discover and incorporate these usage correlations into the embeddings 138.

In this way, the embeddings 138 may provide a comprehensive dataset encoded with various aspects and characteristics of the interactive multimedia content items 124. In one or more embodiments, the embedding engine 114 may tokenize the interactive multimedia content items 124, titles, attribute tags 132, genomes 134, usage data 136 and/or usage correlations and assign a unique index to each tokenized construct. The embedding engine 114 may define a multi-dimensional vector or embedding space having dimensions that each represent a unique aspect or context of the interactive multimedia content items. Accordingly, the embedding engine 114 may generate an embedding 138 for each interactive multimedia content item 124 initialized in the dimensions of the vector space. In this way, each unique aspect or features of the interactive multimedia content items 124 (e.g., discovered, learned, or identified by the embedding engine 114) may reside within a dimension, and the numerical representation of the embeddings 138 may indicate if and to what degree, each interactive multimedia content item exhibits a given attribute (e.g., dimension). For example, the vector space may represent the interactive multimedia content items 124 and their semantic and/or contextual relationships in a continuous and nuanced manner. Interactive multimedia content items 124 that are similar in one or more aspects may be represented by vectors that are closer in the vector space (e.g., in the respective dimension of the similar aspects) allowing for the identification of these similarities.

The embedding engine 114 may generate embeddings 138 in this way for each of the interactive multimedia content items 124 in order that the interactive multimedia content items 124 may be compared and similarities between the interactive multimedia content items 124 may be learned. This may facilitate identifying clusters of interactive multimedia content items 124 that are similar in one or more aspects, as described herein. The embedding engine 114 may store the embeddings 138 to the data storage 122 as cluster data 130.

Figure 5:
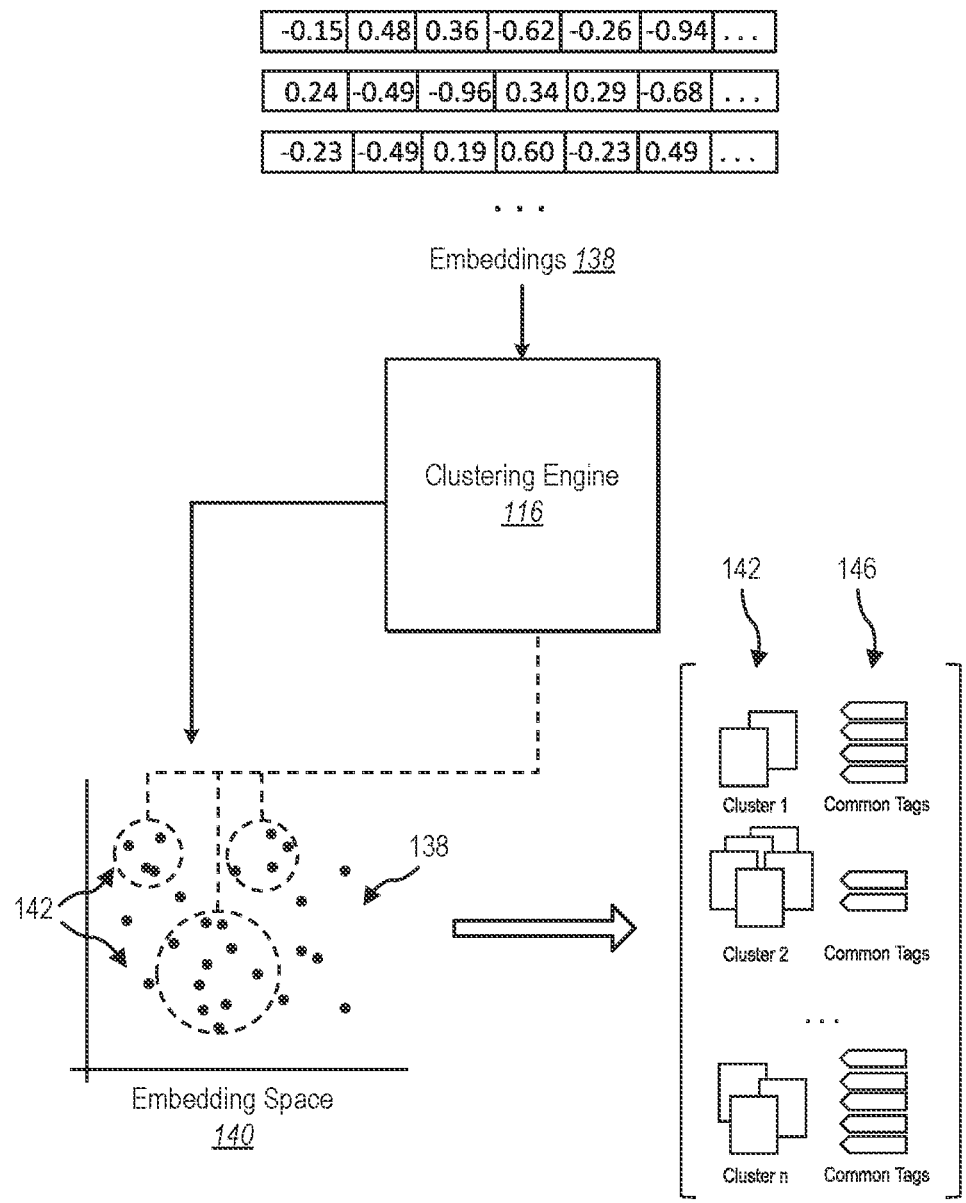
FIG. 5 illustrates example features and functionalities of a clustering engine as described herein, according to at least one embodiment of the present disclosure.

Additional detail will now be discussed in connection with using the embeddings 138 to determine clusters of interactive multimedia content items. As shown in FIG. 5, the content cluster system 110 includes a clustering engine 116 that receives as input the embeddings 138 and maps the embeddings within an embedding space 140 (e.g., a multi-dimensional space having a number of dimensions corresponding to the number of values within the respective embeddings 138). In some embodiments, the clustering engine 116 receives the embeddings 138 and identifies one or more clusters 142 of embeddings (and corresponding interactive multimedia content items 124). The clustering engine 116 may identify the clusters 142 based on similar embeddings 138 being located close to each other in one or more dimensions in an embedding space 140. For example, the clustering engine 116 may measure or determine similarity between embeddings 138 through various distance metrics, such as a Euclidean or cosign distance between two points within the embedding space 140. These metrics may quantify the degree of similarity or dissimilarity between the embeddings 138 based on a quantifiable distance between embeddings 138. The clusters 142 may be defined and/or identified in any other manner. For example, clustering algorithms such as K-means or hierarchical clustering may identify clusters 142 based on minimizing distance or dissimilarity within clusters while maximizing distance or dissimilarity between clusters 142.

In this way, embeddings 138 that are similar in one or more aspects (e.g., in one or more dimensions) will be positioned close to each other (e.g., in those dimensions) and may be identified as pertaining to a cluster 142. For example, as discussed above, attribute tags 132 may each be represented (or may reside within) a unique dimension of the embedding space 140. Thus embeddings 138 that are located close to each other in a specific dimension may indicate that the underlying interactive multimedia content items 124 possess the attribute tags 132 corresponding to that dimension (e.g., or otherwise exhibit features or attribute tags 132 similar to that dimension).

The similarity between embeddings 138 may also be indicated by the usage data 128 encoded in the embeddings 138. For example, a group of embeddings 138 may be positioned close to one another indicating that they all possess the same attribute tag 132, and another embedding 138 may not have that attribute tag 132 but may nonetheless be positioned near the group of embeddings 138 based on usage correlations between that embedding 138 and one or more of the embeddings 138 in the group. Thus, the embedding may be identified as similar to other embeddings exhibiting a certain attribute despite not possessing that attribute itself. Indeed, because the clustering is determined based on a combination of usage data and attribute data, titles having similar attribute tags may not necessarily be grouped within the same cluster where the usage data does not necessarily support clustering the respective titles. Similarly, titles that are dissimilar, but having similar usage data profiles may be grouped together within the same cluster(s).

The clusters 142 may be defined according to any number of rulesets, algorithms, or criteria. For example, the clusters 142 may be defined based on a set of common attribute tags 146 that each embedding 138 in the cluster 142 possesses. These clusters 142 may be hard clusters in that each embedding 138 possess each of the common attribute tags 146. In another example, soft clusters may be defined where each embeddings 138 in the cluster 142 possess most (but not all) of the common attribute tags 146.

In some embodiments, the clustering engine 116 may prefer or favor defining clusters 142 based on similarity of semantic meaning (e.g., similarity of attribute tags 132) over identified usage correlations between interactive multimedia content items 124. In some embodiments, the clustering engine 116 may prefer or favor defining clusters 142 that have several or many common tags 146 as opposed to clusters 142 that have few common tags 146 (e.g., 1 to 2). For example, identifying a cluster 142 of interactive multimedia content items 124 that are all tagged as "online multiplayer" may not be as meaningful or detailed as identifying a cluster 142 of interactive multimedia content items 124 that are each "hybrid play," "online multiplayer" multimedia content with "infinite completion time" and "bridge cosmetics." The clustering engine 116 may accordingly be optimized to define clusters 142 that have many common attribute tags 146 among the interactive multimedia content items 124.

In some embodiments, the clustering engine 116 may identify one or more attribute tags 132 that are uncommon, rare, or low-frequency, such as attribute tags 132 that do not apply to very many interactive multimedia content items 124 and apply a higher weight to those individual attributes in determining one or more clusters 142. In such cases, the clustering engine 116 may identify a cluster 142 based on interactive multimedia content items 124 that each possess this one attribute tag 132 (or a few attribute tags 132 including this low-frequency attribute tag 132). This may facilitate, for example, identifying a content/feature space that not many interactive multimedia content items 124 encompass, and the clustering engine 116 may accordingly identify a cluster 142 based on interactive multimedia content items 124 that exhibit this infrequently-used attribute.

In some embodiments, the clustering engine 116 may define clusters 142 based on negative correlations of the embeddings 138 with certain attribute tags 132. For example, the clustering engine 116 may identify a cluster 142 based on identifying that all or most of the embeddings 138 in the cluster 142 are not tagged with certain attribute tags 132.

The clustering engine 116 may implement any other means, techniques, or criteria for defining clusters 142, and/or may combine any of the clustering techniques described herein. In this way, the clustering engine 116 may identify one or more clusters 142 of embeddings to facilitate identifying a corresponding cluster 142 of interactive multimedia content items 124 that are similar in one or more respects.

While the embedding space 140 and associated embeddings 138 and embedding clusters 142 are represented in FIG. 5 as 2-dimensional and/or with respect to a 2-dimensional coordinate system, this representation is merely illustrative, and it should be understood that the embedding space 140 may include any number of dimensions, and likely includes more than two or three dimensions as can be illustrated in connection with this disclosure. The clustering engine 116 may store the identified clusters 142 to the data storage 122 as cluster data 130.

Figure 6:
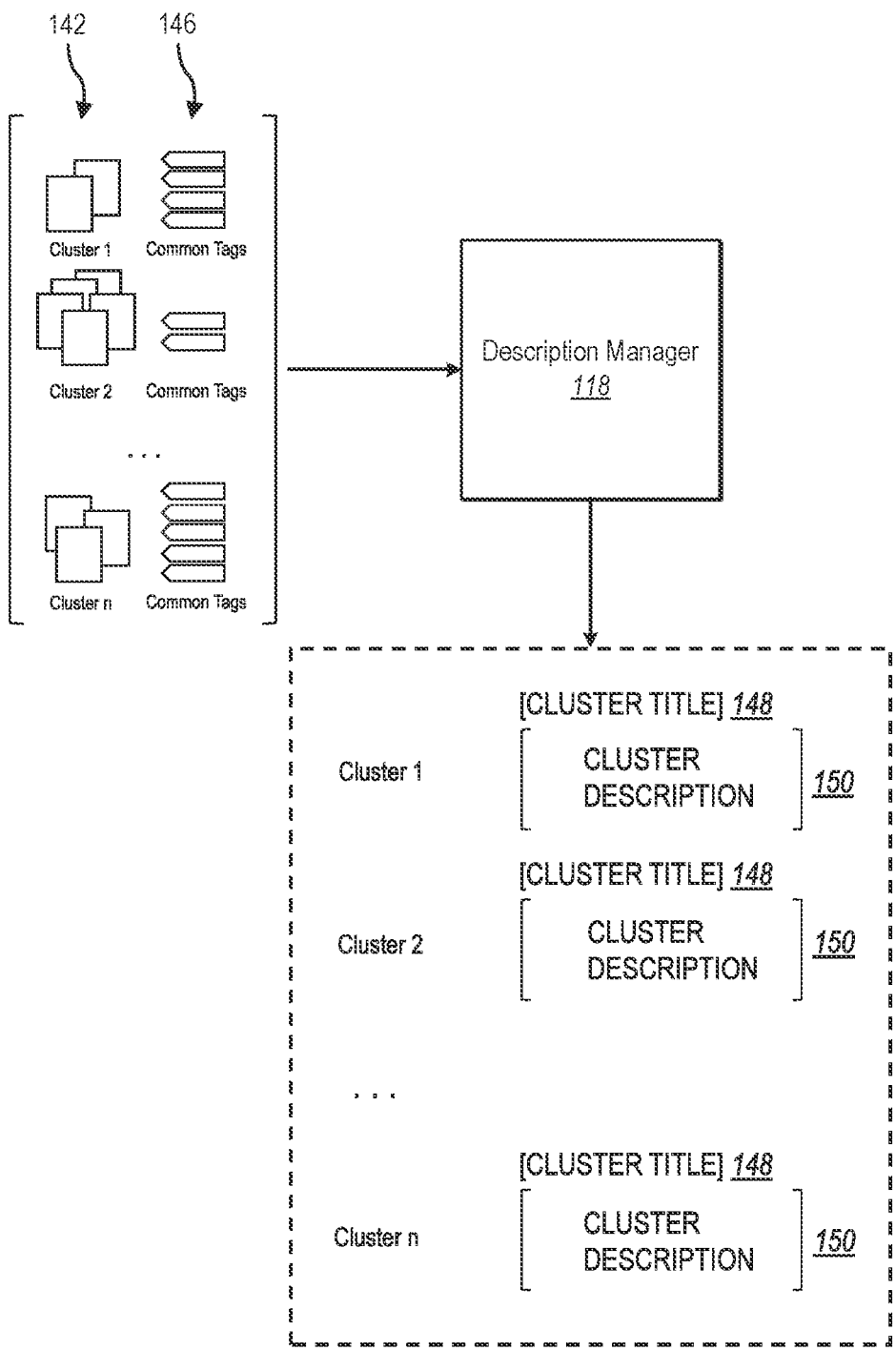
FIG. 6 illustrates example features and functionalities of a description manager as described herein, according to at least one embodiment of the present disclosure.

As mentioned above, the content cluster system 110 includes a description manager 118. FIG. 6 illustrates example features and functionalities of the description manager 118 as described herein, according to at least one embodiment of the present disclosure.

The description manager 118 may facilitate describing, in plain language, the clusters 142 identified by the clustering engine 116. For example, the description manager 118 may receive the clusters 142 and associated common tags 146 for each cluster and may generate a cluster title 148 and a cluster description 150 that describe each cluster 142. The description manager 118 may generate the cluster title 148 and cluster description 150 based on the attribute tags 132, identified in the common tags 146 for each cluster 142. For example, the description manager 118 may identify, from the common tags 146, one or more aspects, themes, qualities, attributes, etc., that describe the interactive multimedia content items 124 in the cluster 142 generally.

As an illustrative example, a cluster 142 of interactive multimedia content items 124 may be identified having common tags 146 of "multiplayer online," "high replayability," "infinite completion time," and "rich character cosmetics," among others. Based on these common tags 146, the description manager 118 may generate a cluster title of "Endless Avatars Unleashed," which may describe generally certain common elements, themes, attributes etc., of the interactive multimedia content items 124 in the cluster 142. The description manager 118 may generate a cluster description 150 of "a diverse array of multiplayer experiences with a strong emphasis on customization, social interaction, and high replayability. Players can expect to be captivated by a wide variety of game genres and styles, all designed to keep them engaged with an ever-changing and virtually limitless array of content."

In this way, the cluster title 148 and cluster description 150 may summarize the interactive multimedia content items 124 in the cluster 142, and may provide an explanation of why the interactive multimedia content items 124 are clustered together, or what semantic attributes the interactive multimedia content items 124 in the cluster 142 have in common. The description manager 118 may store the cluster titles 148 and cluster descriptions 150 to the data storage 122 as part of the cluster data 130, such as metadata stored or associated with each cluster 142 of the cluster data 130.

In some embodiments, the description manager 118 is, or implements, a machine learning model such as an LLM for generating the cluster title 148 and cluster description 150. In some embodiments, the description manager 118 implements the same LLM implemented in connection with the tagging engine 112 for tagging the interactive multimedia content items 124. For example, the description manager 118 may generate an input (e.g., a second input) or prompt for the LLM to generate the cluster title 148 and cluster description 150. The prompt may include the associated titles of the interactive multimedia content items 124 of the cluster 142, as well as the common tags 146 associated with each cluster 142. As discussed above, the prompt may be generated for any manner of input to the LLM, and may indicate one or more parameters for directing the LLM to generate the cluster title 148 and cluster description 150 output.

In some embodiments, the description manager 118 may be supervised, for example, by an administrator of the content cluster system 110. For example, an administrator may provide feedback data to the description manager 118 to verify the cluster titles 148 and/or cluster descriptions 150. In this way, the description manager 118 may be controlled or supervised by an administrator to ensure that the cluster titles 148 and cluster descriptions 150 accurately and/or meaningfully describe the clusters 142, as well as to ensure that the description manager 118 does not generate cluster titles 148 and/or cluster descriptions 150 that are explicit, inappropriate, or harmful. In some embodiments, the description manager 118 may generate multiple cluster titles 148 and/or cluster descriptions 150, and may facilitate selecting a cluster title 148 and cluster description 150 based on feedback data from an administrator. In this way, the description manager 118 may generate a cluster title 148 and cluster description 150 for each of the clusters 142 in order that each cluster 142 may be identified and described in a meaningful, nuanced, and detailed way, highlighting subtle similarities between interactive multimedia content items 124 identified with the common tags 146.

Figure 7:
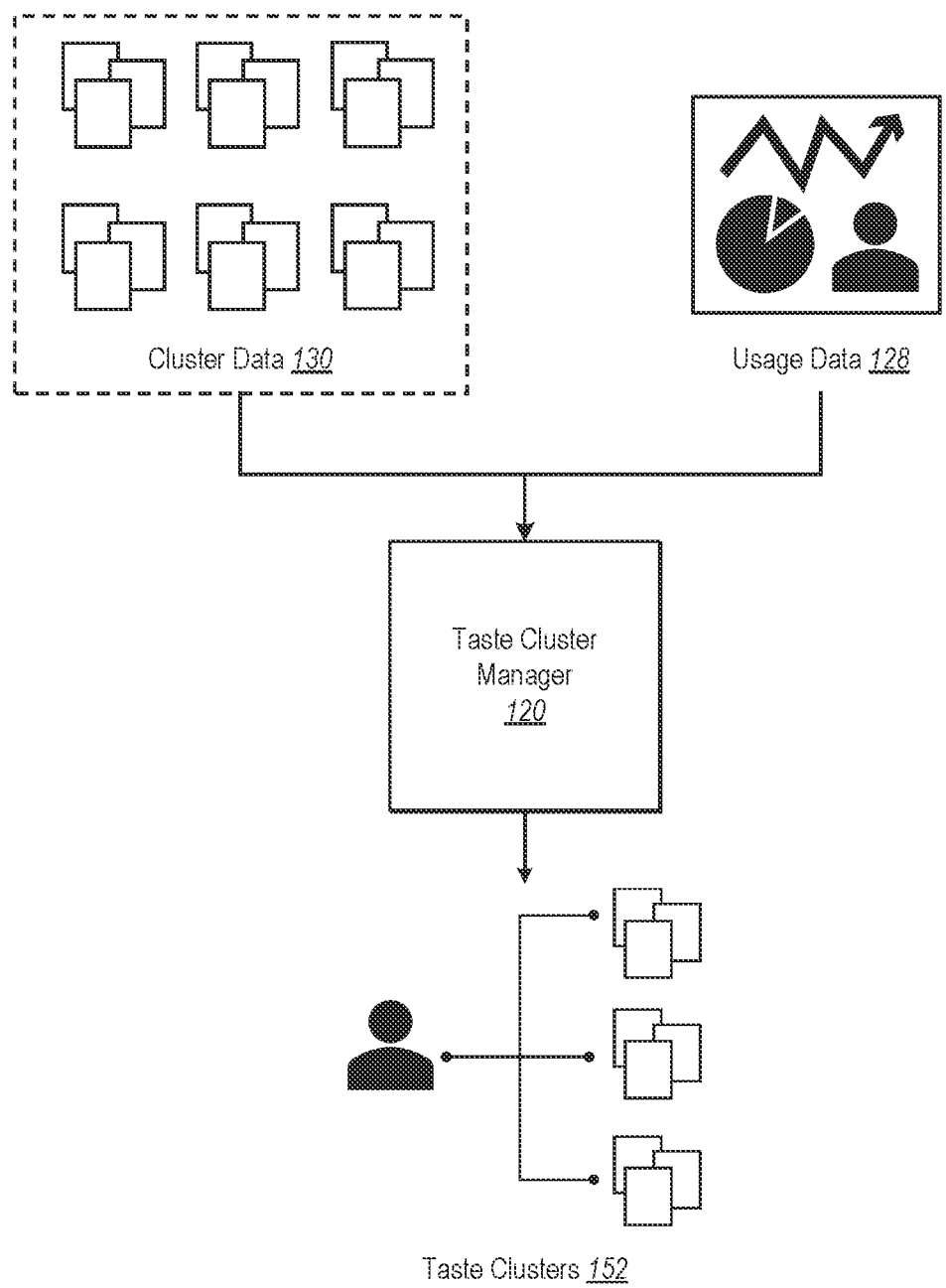
FIG. 7 illustrates example features and functionalities of a taste cluster manager as described herein, according to at least one embodiment of the present disclosure.

As mentioned above, the content cluster system 110 includes a taste cluster manager 120. FIG. 7 illustrates example features and functionalities of the taste cluster manager 120 as described herein, according to at least one embodiment of the present disclosure. The taste cluster manager 120 may identify one or more preferences of a user for interactive multimedia content items 124 and may facilitate identifying one or more of the clusters 142 that may appeal to the user's preferences.

In some embodiments, the taste cluster manager 120 receives the clusters 142 and associated information identified in the cluster data 130. For example, the taste cluster manager 120 may identify the interactive multimedia content items 124 in each cluster 142 including the titles of each interactive multimedia content item1 124, as well as the associated cluster title 148 and cluster description 150 for the cluster 142.

In some embodiments, the taste cluster manager 120 receives the usage data 128. The taste cluster manager 120 may identify, from the usage data 128, information associated with an individual user (e.g., a player of a gaming console). For example, the taste cluster manager 120 may identify usage statistics for the user with respect to the collection of interactive multimedia content items 124. In some embodiments, the taste cluster manager 120 identifies a duration, frequency, and/or recency of engagement of the user with one or more of the interactive multimedia content items 124. In this way, the taste cluster manager 120 may characterize the behavior of the user in order to identify the preferences of the user for interactive multimedia content.

In some embodiments, the taste cluster manager 120 identifies one or more taste clusters 152 for the user. For example, a taste cluster 152 may be a cluster 142 of interactive multimedia content items 124 that the taste cluster manager 120 determines may appeal to the preferences of the user for interactive multimedia content. The taste cluster manager 120 may identify multiple clusters 142 as taste clusters 152 for associating with and/or providing to the user.

The taste cluster manager 120 may identify the taste clusters 152 based on the usage data 128 for the user. For example, the taste cluster manager 120 may identify an engagement history for the user with a particular interactive multimedia content item 124, and may accordingly select one or more of the clusters 142 to which that interactive multimedia content item 124 belongs for associating with the user as a taste cluster 152. For instance, the taste cluster manager 120 may identify an interactive multimedia content item 124 (e.g., Title A) with which the user has engaged for a threshold duration of time, and may accordingly select one or more taste clusters that include that interactive multimedia content item 124 (e.g., Title A). In another example, the taste cluster manager 120 may identify an interactive multimedia content item 124 (e.g., Title B) with which the user has recently engaged within a threshold amount of time, and may accordingly select one or more taste clusters that include that interactive multimedia content item 124 (e.g., Title B). In some embodiments, the taste cluster manager 120 selects taste clusters 152 based on prioritizing or preferring recency of engagement over duration of engagement.

The taste cluster manager 120 may rank or order the taste clusters 152 determined for a user. For example, if the user has engaged with multiple interactive multimedia content items 124 in a taste cluster 152 (e.g., recently and/or for a certain duration of time), the taste cluster manager 120 may rank the associated taste cluster 152 higher than, for example, a taste cluster 152 having less interactive multimedia content items 124 (or only 1) with which the user has engaged. In this way, the taste cluster manager 120 may associate with a user (and present to the user as described below) interactive multimedia content items 124 that may appeal to the user based on the interactive multimedia content items 124 with which the user chooses to engage.

The taste clusters 152 may provide a valuable recommendation to the user for interactive multimedia content items 124. For example, as described here, the clusters 142 may include a cluster title 148 and cluster description 150 that are based on a nuanced similarity between a variety of attributes of the interactive multimedia content items 124. In addition to providing a curated list of interactive multimedia content items 124 that the user may enjoy, the cluster title 148 and cluster description 150 may not only provide a description to the user of how the interactive multimedia content items 124 are related, but may facilitate the user interpreting and understanding why the interactive multimedia content items 124 are being suggested. In this way, the taste cluster manager 120 may help the user to find interactive multimedia content items 124 that may match their preferences for interactive multimedia content, which may help to further drive user engagement in the interactive multimedia content items 124 and/or the platform itself.

In some embodiments, the taste cluster manager 120 may generate a report of the taste clusters 152 and may present the report via a graphic user interface of a user device. FIG. 8 illustrates an example report 800, according to at least one embodiment of the present disclosure. The report 800 may indicate a plurality of taste clusters 152 that the taste cluster manager 120 has determined are applicable to a user. The report 800 may indicate the cluster title 148 and cluster description 150 for each of the taste clusters 152. The report 800 may indicate the associated interactive multimedia content items 124 of each taste cluster 152 including the title of each the interactive multimedia content item 124 and/or artwork (e.g., cover art, album art, etc.) associated with one or more of the interactive multimedia content items 124.

In some embodiments, the report 800 may be interactive. For example, a user may scroll or pan through some or all of the information of the report 800. For instance, the taste clusters 152 (and/or associated information) may span or encompass more area than is available on one screen, and the user may interactively access off-screen taste clusters 152 and/or associated information. In some embodiments, the report may facilitate a user selecting and engaging with one or more of the interactive multimedia content items 124. For example, based on the taste clusters 152 and the interactive multimedia content items 124 presented via the report 800, a user may select an interactive multimedia content item 124 and the content cluster system 110 may facilitate the user playing, watching, listening to, etc. the interactive multimedia content item 124. In this way, the multimedia content clustering features of the content cluster system 110 may be provided to the user via the report 800. The report 800 may include any other information related to the interactive multimedia content items 124 and/or taste clusters 152 consistent with that described herein.

Figure 9:
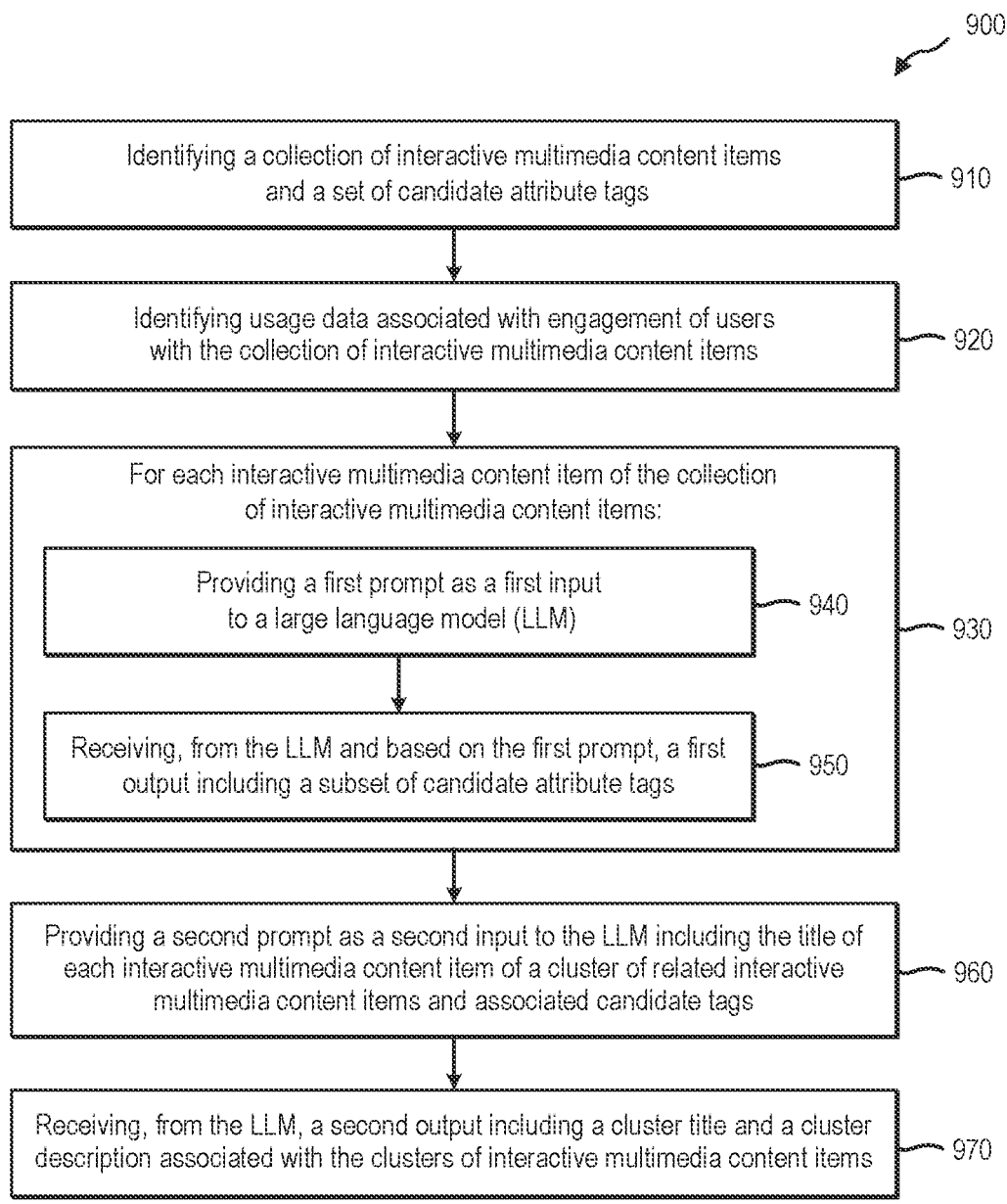
FIG. 9 illustrates a method or a series of acts for generating a cluster description for a grouping of interactive multimedia content items as described herein, according to at least one embodiment of the present disclosure.

FIG. 9 illustrates a method 900 or a series of acts for generating a cluster description for a grouping of interactive multimedia content items as described herein, according to at least one embodiment of the present disclosure. While FIG. 9 illustrates acts according to one embodiment, alternative embodiments may add to, omit, reorder, or modify any of the acts of FIG. 9.

In some embodiments, the method 900 includes an act 910 of identifying a collection of interactive multimedia content items and a set of candidate attribute tags. As further shown, the method 900 includes an act 920 of identifying usage data associated with engagement of users with the collection of interactive multimedia content items.

As further shown in FIG. 9, the method 900 includes a set of acts 930 to be performed for each interactive multimedia content item of the collection of interactive multimedia content items. In particular, the set of acts 930 includes an act 940 of providing a first prompt as a first input to a large language model (LLM). In one or more implementations, the act 940 includes providing a first prompt as a first input to a large language model (LLM), the first prompt including a title of the interactive multimedia content item and the set of candidate attribute tags. The set of acts 930 additionally includes an act 950 of receiving, from the LLM and based on the first prompt, a first output including a subset of candidate attribute tags. In one or more implementations, the act 950 includes receiving, from the LLM and based on the first prompt, a first output including a subset of the candidate attribute tags determined to be associated with the interactive multimedia content item.

As further shown in FIG. 9, the method 900 includes an act 960 of providing a second prompt as a second input to the LLM including the title of each interactive multimedia content item of a cluster of related interactive multimedia content items and associated tags. In one or more implementations, the act 960 includes providing a second prompt as a second input to the LLM, the second prompt including titles of interactive multimedia content items of a cluster of interactive multimedia content items determined to be related, the second prompt further including candidate attribute tags associated with each of the titles of the interactive multimedia content items of the cluster of interactive multimedia content items.

As further shown in FIG. 9, the method 900 includes an act 970 of receiving, from the LLM, a second output including a cluster title and a cluster description associated with the clusters of interactive multimedia content items. In one or more implementations, the act 970 includes receiving, from the LLM, a second output including a cluster title and a cluster description associated with the cluster of interactive multimedia content items, the second output being generated by the LLM based candidate attribute tags associated with the titles of interactive multimedia content items of the cluster.

In one or more embodiments, for each interactive multimedia content item of the collection of interactive multimedia content items, the method 900 includes applying an embedding model to the first output of the LLM and to usage data associated with the interactive multimedia content item to generate a multi-dimensional embedding including a plurality of numerical values representing the interactive multimedia content, the plurality of numerical values being determined based on a combination of the subset of the candidate attribute tags and the usage data associated with the interactive multimedia content item. In one or more embodiments, the titles of interactive multimedia content items of the cluster are determined to be related based on proximity of multi-dimensional embeddings associated with the titles mapped to a multi-dimensional space.

In one or more embodiments, the method includes an act of associating the cluster of interactive multimedia content items with a user account based on usage data of the user account. In one or more embodiments, the user account is associated with the cluster based on engagement of the user account with at least one of the interactive multimedia content items of the cluster of interactive multimedia content items. In one or more embodiments, the user account is associated with the cluster based on a duration and a recency of engagement information from the usage data of the user account.

In one or more embodiments, the method 900 includes an act of receiving a verification of the second output based on feedback data. In one or more embodiments, receiving the second output includes receiving, from the LLM, a plurality of cluster titles and a plurality of cluster descriptions. In one or more implementations, receiving the verification of the second output includes receiving a selection of a cluster title from the plurality of cluster titles and an associated cluster description from the plurality of cluster descriptions.

In one or more embodiments, the method 900 includes an act of presenting the cluster title, the cluster description, and the titles of the associated interactive multimedia content items via a graphical user interface of a user device. In one or more embodiments, the method 900 includes an act of providing a plurality of second prompts indicating a plurality of clusters of interactive multimedia content items as second inputs to the LLM, and receiving, from the LLM, a cluster title and a cluster description for each of the plurality of clusters. In one or more embodiments, the method 900 includes an act of associating the plurality of clusters with a user based on the usage data, and presenting the plurality of clusters and the associated cluster titles and cluster descriptions to the user via a graphical user interface of a user device.

Figure 10:
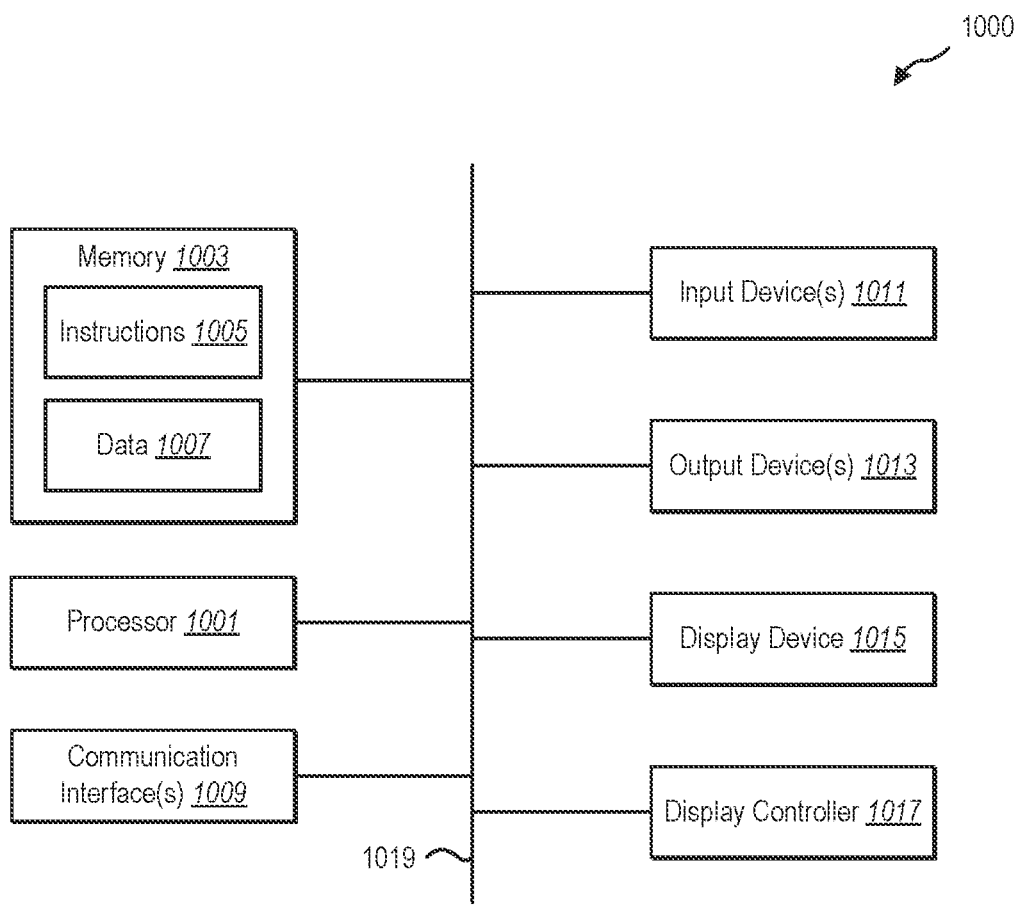
FIG. 10 illustrates certain components that may be included within a computer system.

FIG. 10 illustrates certain components that may be included within a computer system 1000. One or more computer systems 1000 may be used to implement the various devices, components, and systems described herein.

The computer system 1000 includes a processor 1001. The processor 1001 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of generating a cluster description for a grouping of interactive multimedia content items, comprising:
   identifying a collection of interactive multimedia content items to be characterized according to a set of candidate attribute tags;
   identifying usage data associated with engagement of a plurality of users with the collection of interactive multimedia content items;
   for each interactive multimedia content item of the collection of interactive multimedia content items:
      providing a first prompt as a first input to a large language model (LLM), the first prompt including a title of the interactive multimedia content item and the set of candidate attribute tags; and
      receiving, from the LLM and based on the first prompt, a first output including a subset of the candidate attribute tags determined to be associated with the interactive multimedia content item;
   providing a second prompt as a second input to the LLM, the second prompt including titles of interactive multimedia content items of a cluster of interactive multimedia content items determined to be related, the second prompt further including candidate attribute tags associated with each of the titles of the interactive multimedia content items of the cluster of interactive multimedia content items; and
   receiving, from the LLM, a second output including a cluster title and a cluster description associated with the cluster of interactive multimedia content items, the second output being generated by the LLM based candidate attribute tags associated with the titles of interactive multimedia content items of the cluster.

2. The method of claim 1, further comprising:
   for each interactive multimedia content item of the collection of interactive multimedia content items, applying an embedding model to the first output of the LLM and to usage data associated with the interactive multimedia content item to generate a multi-dimensional embedding including a plurality of numerical values representing the interactive multimedia content, the plurality of numerical values being determined based on a combination of the subset of the candidate attribute tags and the usage data associated with the interactive multimedia content item,
   wherein the titles of interactive multimedia content items of the cluster are determined to be related based on proximity of multi-dimensional embeddings associated with the titles mapped to a multi-dimensional space.

3. The method of claim 1, further comprising associating the cluster of interactive multimedia content items with a user account based on usage data of the user account.

4. The method of claim 3, wherein the user account is associated with the cluster based on engagement of the user account with at least one of the interactive multimedia content items of the cluster of interactive multimedia content items.

5. The method of claim 4, wherein the user account is associated with the cluster based on a duration and a recency of engagement information from the usage data of the user account.

6. The method of claim 1, further comprising tuning one or more of a creativity parameter or a confidence parameter of the LLM to modify the first output based on the first prompt prior to generating the second prompt to provide as the second input to the LLM.

7. The method of claim 1, further comprising receiving a verification of the second output based on feedback data.

8. The method of claim 7, wherein receiving the second output includes receiving, from the LLM, a plurality of cluster titles and a plurality of cluster descriptions, and wherein receiving the verification of the second output includes receiving a selection of a cluster title from the plurality of cluster titles and an associated cluster description from the plurality of cluster descriptions.

9. The method of claim 1, further comprising presenting the cluster title, the cluster description, and the titles of the associated interactive multimedia content items via a graphical user interface of a user device.

10. The method of claim 1, further comprising providing a plurality of second prompts indicating a plurality of clusters of interactive multimedia content items as second inputs to the LLM, and receiving, from the LLM, a cluster title and a cluster description for each of the plurality of clusters.

11. The method of claim 10, further comprising associating the plurality of clusters with a user based on the usage data, and presenting the plurality of clusters and the associated cluster titles and cluster descriptions to the user via a graphical user interface of a user device.

12. A system, comprising:
   at least one processor;
   memory in electronic communication with the at least one processor; and
   instructions stored in the memory, the instructions being executable by the at least one processor to:
      identify a collection of interactive multimedia content items to be characterized according to a set of candidate attribute tags;
      identify usage data associated with engagement of a plurality of users with the collection of interactive multimedia content items;
      for each interactive multimedia content item of the collection of interactive multimedia content items:
         provide a first prompt as a first input to a large language model (LLM), the first prompt including a title of the interactive multimedia content item and the set of candidate attribute tags; and
         receive, from the LLM and based on the first prompt, a first output including a subset of the candidate attribute tags determined to be associated with the interactive multimedia content item;
      provide a second prompt as a second input to the LLM, the second prompt including titles of interactive multimedia content items of a cluster of interactive multimedia content items determined to be related, the second prompt further including candidate attribute tags associated with each of the titles of the interactive multimedia content items of the cluster of interactive multimedia content items; and receive, from the LLM, a second output including a cluster title and a cluster description associated with the cluster of interactive multimedia content items, the second output being generated by the LLM based candidate attribute tags associated with the titles of interactive multimedia content items of the cluster.

13. The system of claim 12, further comprising instructions being executable by the at least one processor to:
for each interactive multimedia content item of the collection of interactive multimedia content items, apply an embedding model to the first output of the LLM and to usage data associated with the interactive multimedia content item to generate a multi-dimensional embedding including a plurality of numerical values representing the interactive multimedia content, the plurality of numerical values being determined based on a combination of the subset of the candidate attribute tags and the usage data associated with the interactive multimedia content item,
wherein the titles of interactive multimedia content items of the cluster are determined to be related based on proximity of multi-dimensional embeddings associated with the titles mapped to a multi-dimensional space.

14. The system of claim 12, further comprising instructions being executable by the at least one processor to associate the cluster of interactive multimedia content items with a user account based on usage data of the user account, wherein the user account is associated with the cluster based on engagement of the user account with at least one of the interactive multimedia content items of the cluster of interactive multimedia content items, and wherein the user account is associated with the cluster based on a duration and a recency of engagement information from the usage data of the user account.

15. The system of claim 12, further comprising instructions being executable by the at least one processor to tune one or more of a creativity parameter or a confidence parameter of the LLM to modify the first output based on the first prompt prior to generating the second prompt to provide as the second input to the LLM.

16. The system of claim 12, further comprising instructions being executable by the at least one processor to receive a verification of the second output based on feedback data, wherein receiving the second output includes receiving, from the LLM, a plurality of cluster titles and a plurality of cluster descriptions, and wherein receiving the verification of the second output includes receiving a selection of a cluster title from the plurality of cluster titles and an associated cluster description from the plurality of cluster descriptions.

17. The system of claim 12, further comprising instructions being executable by the at least one processor to:
provide a plurality of second prompts indicating a plurality of clusters of interactive multimedia content items as second inputs to the LLM, and receiving, from the LLM, a cluster title and a cluster description for each of the plurality of clusters;
associate the plurality of clusters with a user based on the usage data, and presenting the plurality of clusters and the associated cluster titles and cluster descriptions to the user via a graphical user interface of a user device.

18. A method of generating a cluster description for a grouping of gaming titles, comprising:
identifying a collection of gaming content items to be characterized according to a set of candidate attribute tags;
identifying usage data associated with engagement of a plurality of users with the collection of gaming content items;
for each gaming content item of the collection of gaming content items:
providing a first prompt as a first input to a large language model (LLM), the first prompt including a title of the gaming content item and the set of candidate attribute tags; and
receiving, from the LLM and based on the first prompt, a first output including a subset of the candidate attribute tags determined to be associated with the gaming content item;
providing a second prompt as a second input to the LLM, the second prompt including titles of gaming content items of a cluster of gaming content items determined to be related, the second prompt further including candidate attribute tags associated with each of the titles of the gaming content items of the cluster of gaming content items; and
receiving, from the LLM, a second output including a cluster title and a cluster description associated with the cluster of gaming content items, the second output being generated by the LLM based candidate attribute tags associated with the titles of gaming content items of the cluster.

19. The method of claim 18, further comprising:
for each gaming content item of the collection of gaming content items, applying an embedding model to the first output of the LLM and to usage data associated with the gaming content item to generate a multi-dimensional embedding including a plurality of numerical values representing the gaming content, the plurality of numerical values being determined based on a combination of the subset of the candidate attribute tags and the usage data associated with the gaming content item,
wherein the titles of gaming content items of the cluster are determined to be related based on proximity of multi-dimensional embeddings associated with the titles mapped to a multi-dimensional space.

20. The method of claim 19, further comprising associating the cluster of gaming content items with a user account based on usage data of the user account.

* * * * *